(12) United States Patent
Tewani et al.

(10) Patent No.: US 6,259,783 B1
(45) Date of Patent: Jul. 10, 2001

(54) METHOD OF ENHANCING CALL PROCESSING IN A NUMBER PORTABILITY ENVIRONMENT

(75) Inventors: Kamlesh T. Tewani, Freehold; Lance Wayne Wilson, Marlboro, both of NJ (US)

(73) Assignee: AT&T Corp.

( * ) Notice: Subject to any disclaimer, the term of this patent is extended or adjusted under 35 U.S.C. 154(b) by 0 days.

(21) Appl. No.: 08/861,756

(22) Filed: May 22, 1997

(51) Int. Cl.[7] ..................................... H04M 7/00
(52) U.S. Cl. ..................... 379/220; 379/207; 379/211; 455/445
(58) Field of Search ................... 379/207, 219, 379/220, 229, 221, 211, 212, 269; 455/445

(56) References Cited

U.S. PATENT DOCUMENTS

| | | | |
|---|---|---|---|
| 5,515,427 | * 5/1996 | Carlsen et al. | 379/220 |
| 5,625,681 | * 4/1997 | Butler, II | 379/207 |
| 5,689,555 | * 11/1997 | Sonnenberg | 379/220 |
| 5,696,816 | * 12/1997 | Sonnenberg | 379/220 |
| 5,748,724 | * 5/1998 | Sonnenberg | 379/220 |
| 5,796,813 | * 8/1998 | Sonnenberg | 379/220 |
| 5,974,129 | * 10/1999 | Bodnar | 379/207 |

* cited by examiner

Primary Examiner—Fan Tsang
Assistant Examiner—Isaak R. Jama
(74) Attorney, Agent, or Firm—Kenyon & Kenyon

(57) ABSTRACT

A method reduces the number of queries generated to a number portability database. The number portable communication system includes a local cache associated with the switching office or facility responsible for identifying and controlling the routing of calls to portable numbers. By including the cache and only generating a request to the number portability database when the cache either does not contain LRN response information or if a call attempted based on LRN response information in the cache fails, the total number of queries to the number portability database are reduced. This reduces query traffic as well as speeds up the processing of calls able to use cached information.

22 Claims, 4 Drawing Sheets

| H | G | F | E | D | C | B | A |
|---|---|---|---|---|---|---|---|
| ISDN USER PART PREFERENCE INDICATOR | | RESERVED | | | | | |
| RESERVED | | N | M | RESERVED | | | |

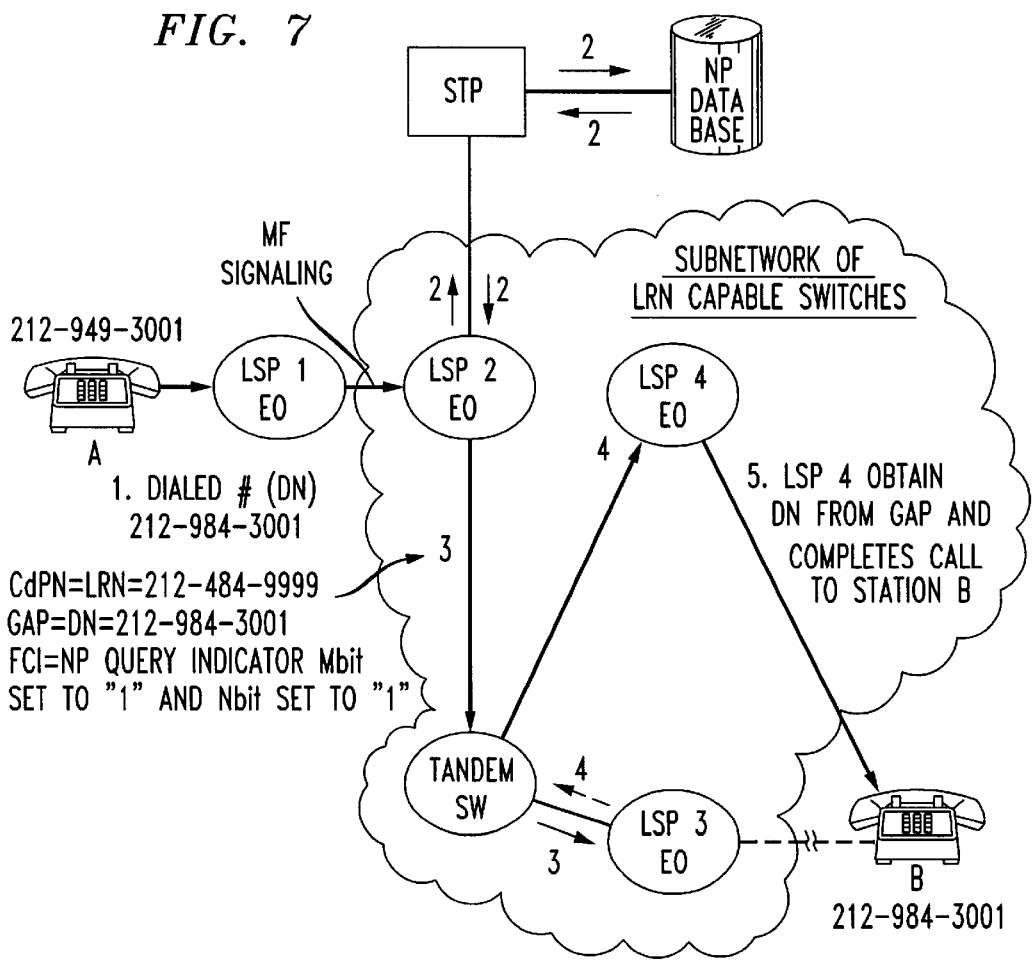

METHOD OF ENHANCING CALL PROCESSING IN A NUMBER PORTABILITY ENVIRONMENT

BACKGROUND OF THE INVENTION

The present invention relates to a method for improving call processing in a number portability environment. Specifically, the present invention relates to a method for reducing queries to a database used to provide routing information in a number portability context.

The U.S. telecommunications network is in a state of transition. In the not too distant future it is expected that the monopoly held by local exchange carriers will be substantially altered and that Competitive Access Providers (CAPs) will begin to provide competitive local exchange service. To accomplish this without creating an excessive burden on customers who wish to receive service from a CAP, the customers will be able to change to a CAP without requiring the change of a telephone number. This type of flexibility is referred to as service provider number portability. It enables the subscriber to change his or her service provider while maintaining the same directory number. The public policy goal is to ensure that there is no performance degradation between carriers.

It is also expected that subscribers will be able to move between geographic locations within some reasonably defined region, for example, within the same LATA, while retaining the same telephone number. This is referred to as geographic portability. In this case the subscriber may or may not change service providers.

An additional type of portability relates to a customer's desire to change the type of service in use. For instance, a customer may change from Plain Old Telephone Service (POTS) to IDSN service and wish to maintain the same directory number. This is referred to as service portability.

AT&T has already proposed a system for providing both service provider and geographic number portability. This system uses a mechanism referred to as the Location Routing Number (LRN) mechanism. In the Location Routing Number mechanism, during call processing a local switch analyzes the dialed number to determine both whether that number is from a portable NPA-NXX, that is, whether at least one NPA-NXX-XXXX has ported to another local switch, and whether the call is interswitch, that is, whether or not a different local switch serves the destination number. If the number's NPA-NXX is determined to be portable and if the call is interswitch then the network switch launches a query to a number portability (NP) database. If the number has been ported, the database then returns a location routing number (LRN) of the recipient switch to which the dialed number has been ported. The querying switch receives the LRN and uses it to route the call to its correct destination. If the number has not been ported then the NP database returns the dialed number DN rather than a LRN.

Examples of the call flow in the LRN mechanism are illustrated in prior art FIGS. 1 and 2.

FIG. 1 illustrates call processing in an LRN mechanism when a call from a calling party A to a called party B is a local interswitch call. In the example, in step 1 party A (having number 212-949-3001) dials 212984-3001, the number assigned to party B. The end office (EO) 10 of local service provider (LSP) 1 receives the dialed number and determines that the number's NPA-NXX is portable. EO 10 then launches a query via Signaling Transfer Point (STP) 20 to a number portability (NP) database 30. The query includes the dialed number received by EO 10. The NP database 30 then returns the location routing number to the EO 10. The first six digits of the LRN are indicative of a particular LSP EO. The LRN is populated in the Called Party Number ISUP (ISDN user part) parameter of the Initial Address Message (IAM) of the Signaling System 7 (SS7) protocol. The dialed number is placed in the generic address parameter (GAP). Furthermore, an indicator is set to represent the fact that the routing information is based on a query to the database. When the EO 10 receives this information it then routes the call to the tandem switch 40 based on the first six digits of the LRN. The tandem switch then routes the call to the end office of the LSP3, 50, to which called party B is presently ported rather than the end office of LSP 2, 60, to which the called party B was previously ported. Finally, in a fifth step the EO 50 presently serving the ported subscriber recognizes its own LRN and obtains the dialed number from the generic address parameter and uses that information to complete the call to station B. In summary, for interswitch calls to portable NPA-NXXs, the end office switch 10 launches a query to a database to obtain routing information for the end office which is servicing the ported customer.

FIG. 2 illustrates a similar situation in the context of an interLATA call where the call must be serviced by an Inter-Exchange Carrier (IXC). Like elements in FIGS. 1 and 2 bear identical reference numerals. In this instance the EO 10 determines that the call is an interLATA call and therefore sends the dialed number information to the IXC originating switch 15. The IXC recognizes the dialed number as pertaining to a portable NPA-NXX and generates a query using the dialed number (212-984-3001 in the illustrated example). The query goes to the Signaling Transfer Point (STP) 25 and is forwarded to a number portability (NP) database 35. The NP database 35 could be a national universal database. The distinctions between the database 35 of FIG. 2 and the database 30 of FIG. 1 could correspond to the differences between the national and local databases described in co-pending application serial no. —, the entire disclosure of which is incorporated by reference hereto. As in the case of the query response in FIG. 1, if the number has been ported, the NP database 35 provides the LRN information associated with the dialed number. The originating IXC switch formats an ISUP IAM and places the LRN information (here 212-484-9999) in the called party number parameter. The dialed number is stored in the generic address parameter and the M-bit of the Forward Call indicator (FCI) is set to indicate that the NP database 35 was queried. The originating IXC 15 then routes the call to terminating IXC switch 45 based on the first six digits of the LRN. The terminating IXC switch determines a routing path to the EO 55 of LSP 3, 50, based on the first six digits of the LRN. The end office 55 recognizes its own LRN and then obtains the dialed number from the GAP and completes the call to station B.

In the two examples described, a query is launched to the database, either local database 30 or national database 35 each time an interswitch call to a portable NPA-NXX is detected. As a result, the system generates a large number of queries. In fact, for a frequently dialed number a query related to that dialed number may have been processed only a few minutes or even perhaps just a few seconds, earlier. These queries come at a cost. First, there is the load on the system in query traffic. Then there is the processing to be done at the NP database to respond to all queries. Finally, there is a built-in delay for processing all interswitch calls to portable NPA-NXXs since a query must be launched and processed before the call is routed. It would be beneficial if the number of queries could be reduced, thereby reducing both the overall query traffic and the associated call processing time.

SUMMARY OF THE INVENTION

The present invention is directed to a method for enhancing call processing in a number portability environment. In particular, the invention reduces the number of queries to an external database, thereby lessening query traffic and enabling faster attempts at routing calls to frequently dialed numbers.

In accordance with the present invention a cache memory is associated with the local exchange or inter-exchange carrier switch responsible for processing the call to the portable NPA-NXX. The cache memory stores, for a limited period of time, the response information received from the number portability database in response to queries launched regarding dialed numbers associated with portable NPA-NXXs. Once the cache memory stores the LRN response information, the Local Exchange or IXC first checks the cache upon receipt of a portable NPA-NXX to determine if the cache contains the response information for that dialed number. If the cache contains such response information, then the local exchange or IXC attempts to route the call based on the cached LRN response information. If the cache does not contain information relating to the dialed number, or if the attempt to route the call based on LRN response information in the cache is unsuccessful, then a query is launched to the database to obtain valid LRN response information for routing.

BRIEF DESCRIPTION OF THE DRAWINGS

FIG. 7 illustrates call flow in a modification of an embodiment of the present invention.

DETAILED DESCRIPTION

Overview

Figure 1:
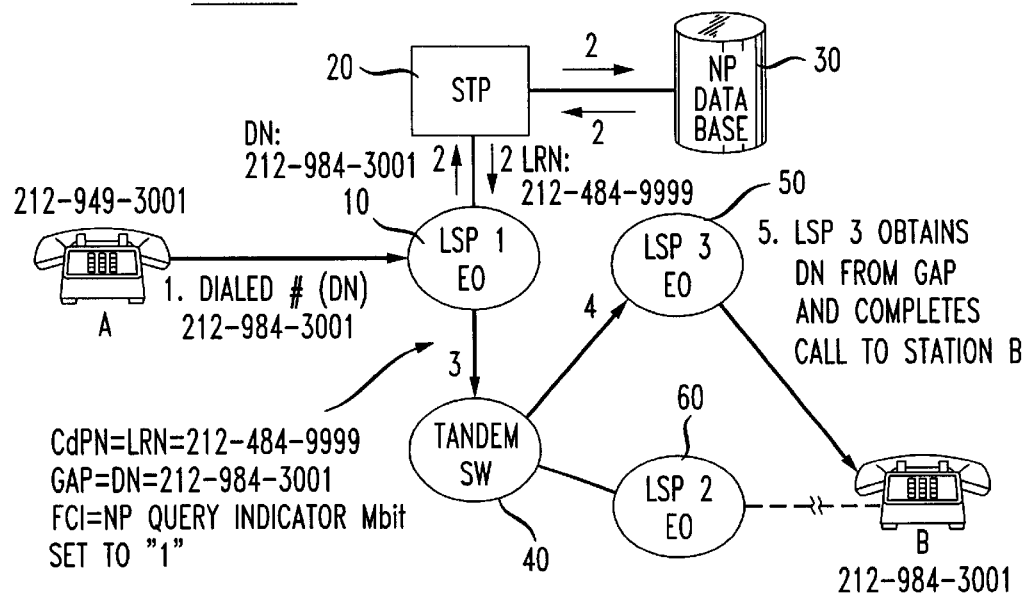
FIGS. 1 and 2 illustrate call flows for known number portability systems.

In accordance with an embodiment of the present invention, a cache is associated with the switching office which is responsible for launching queries to a number portability database. The switching office then first checks the cache to determine whether location routing number response information for a received dialed number is available in the cache. This checking operation is performed before any queries are launched to the number portability database. Thus, if the LRN response information is found in the cache, the switch will attempt to complete the call without need of generating a query to the number portability database. Caching will reduce the number of queries to the database that are actually generated. Furthermore, caching will increase the speed with which calls are processed since it is quicker to access LRN response information from a cache associated with the switch than it is to launch a query and receive data back from the number portability database. Before describing the call flows for implementation of the present invention it is helpful to understand the terminology typically used in the field of number portability. The following glossary is useful in that regard.

Local Service Provider (LSP): A local service provider refers to the provider of local access functionality to an end customer. LSPs are synonymous with local exchange carriers (LECs), alternate local exchange carriers, competitive access providers, and other terms that may be used to refer to providers of local access.

Numbering Plan Area (NPA): The initial group of three digits of a North American numbering plan (NANP) number. The format of NPA is NXX where N is any digit from 2 to 9 and X is any digit from 0 to 9.

Number Portability: Gives the subscriber the ability to move from one end office (i.e., switch) to another and keep its original directory number (DN). There are three types of number portability as described in the background section of the application. FCC and state regulatory activities primarily deal with the implementation of service provider number portability.

Default LSP: In today's environment, the local exchange routing guide (LERG) identifies which NPA-NXXs are assigned to which LSP end offices. The LSP appearing in the LERG is the default LSP for an NPA-NXX and the default LSP for the line numbers is that NPA-NXX.

Default Routing: Refers to routing a call to the default LSP based on the first 6 digits (NPA-NXX) of a NANP number.

Ported Number: A ported number is an end customer's number which is no longer served by the default local service provider as defined in the local exchange routing guide.

Location Routing Number: A location routing number is an identifier of an LSP end office. The LRN of an LSP end office is defined as a 10 digit number of the format NPA-NXX-XXXX such that the first 6 digits is an NPA-NXX assigned (in the local exchange routing guide) to the LSP end office. Also, a 6 digit translation on the NPA-NXX of the LRN will result in routing calls to the LSP end office.

Number Portability (NP) Database: An NP database is a database which stores number portability data, such as the LRNs for ported numbers. Switches will query a number portability database with a dialed number to obtain number portability information for the dialed number.

Destination Number: For routing a call the number used to query the number portability database will be referred to as the destination number. The destination number can be the number received from the incoming called party number (CdPN) parameter (e.g., dialed number) or the number derived after service processing (e.g., the translated number after 800 service processing has been applied).

Calling Party Number (CPN) Parameter: An existing SS7 ISUP (ISDN user part) initial address message (IAM) parameter which currently carries the calling party number.

Called Party Number (CdPN) Parameter: An existing SS7 ISUP initial address message parameter which currently carries the destination number. Switches use the number populated in this parameter to determine how to route the call.

Generic Address Parameter (GAP): The GAP is an existing optional SS7 ISUP initial address message parameter. Multiple GAPs can be defined for a call. Within the LRN approach, the dialed number is populated in the GAP when the LRN is populated in the Called Party Number parameter instead of the called party number.

Bits M and N of a forward call indicator: Bits M and N have been defined as associated with number portability in the current invention.

Portable NPA-NXX: An NPA-NXX is defined as portable if it has one or more ported numbers. That is, destination numbers with a portable NPA-NXX are no longer associated with a unique LSP.

Number Portability (NP) Capable/Non NP Capable Switch: An NP capable switch is a switch which has the capability to support the LRN solution for number portability. A non-NP capable switch is a switch which does not have the capability to support the LRN solution for number portability. A non-NP capable switch can have numbers ported to and from it and have an LRN assigned to it. However, it does not have the capability to query a number portability database nor to recognize its own LRN and retrieve a ported destination number from the generic address parameter.

Description of the Proposed Call Flows

For purposes of the following discussion the assumption will be that at some time prior to the call being processed a called party B was served by end office 160 of local service provider 2 and has been ported to the end office 150 of local service provider 3. The shift between service providers could constitute either restricted geographic portability of the calling party B, or service provider portability, that is a change to a different local service provider or both. In either portability circumstance the ported called party B is served by a different end office and hence a different "service provider".

Figure 3:
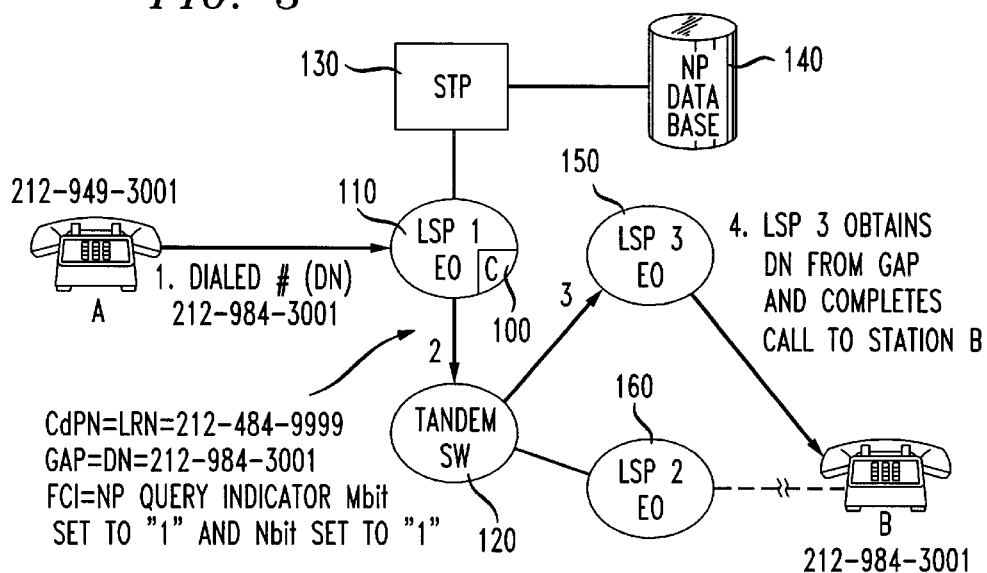
FIGS. 3 to 5 illustrate call flows in accordance with an embodiment of the present invention.

FIG. 3 illustrates the circumstance where the calling party A, being serviced by its local service provider can call the (ported) called party B without need of generating a query to a number portability database. More specifically, calling party A dials the ported number, here 212-984-3001. The end office 110 receives the number and detects that 212-984 is a portable NPA-NXX and that the call is interswitch, i.e., end office 110 does not "serve" called party B. The end office then checks cache 100 to determine whether it contains location routing number response information corresponding to the dialed number. In this call processing sequence, the cache does include the LRN response information, including the LRN of 212-484-9999. Thus, the end office places the LRN in the called party IAM parameter and places the dialed number in the generic address parameter. A query bit indicator, bit N of the FCI, is also set in the IAM message to indicate that the LRN response information has not come from the number portability database. The end office then routes the call via tandem switch 120 to the end office 150 of LSP 3 identified by the LRN from the cache. The LSP 3 end office then recognizes its own LRN in the CdPN parameter, obtains the dialed number from the generic address parameter, and completes the call to station B. In this configuration then, in comparison to the known LRN mechanism described above, a cache memory is provided in association with the end office 100 and is checked before any query for a portable NPA-NXX is launched to the number portability database. If the cache contains LRN response information it will avoid the necessity of having to generate queries to the database.

Figure 4:
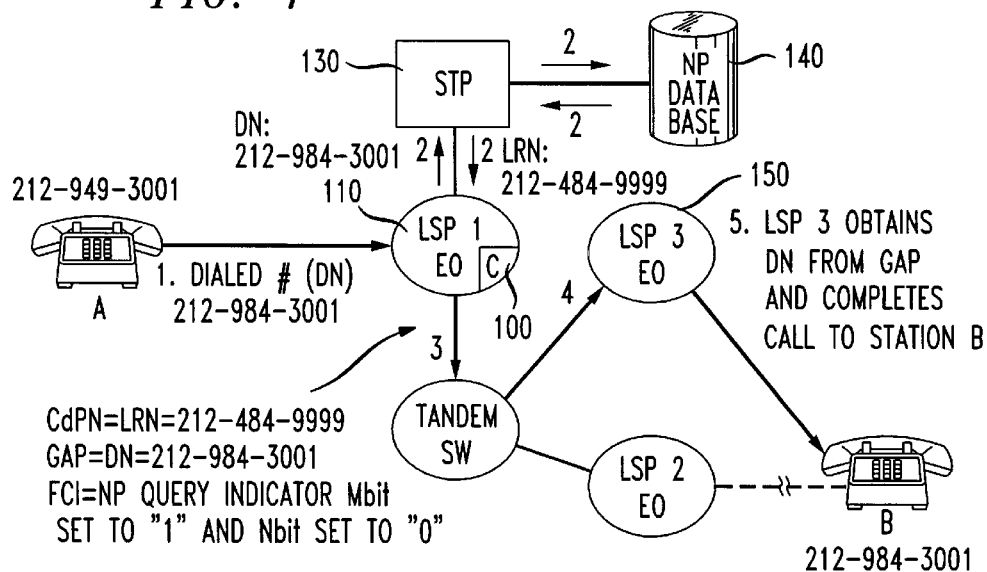

The call flow illustrated in FIG. 4 relates to that circumstance where the cache memory does not contain LRN response information for the dialed number. Here again the calling party dials 212-984-3001. End office 110 detects that the NPA-NXX is portable and checks cache 100 to determine if it contains any LRN response information relating to the dialed number. In this instance the end office does not detect any valid information in the cache relating to the dialed number. The term "valid information" is used to indicate that information within the cache may be deemed to be unreliable after some specified period of time. Therefore, even if response information exists in the cache for a particular called number, those entries may have been in the cache for such a period of time that statistically they are no longer reliable and are therefore treated as invalid pieces of information. More information regarding the consideration given to LRN response information within the cache will be provided below. Continuing with the call flow of FIG. 4, since the cache does not contain any valid information regarding the dialed number, end office 110 launches a query via STP 130 to number portability database 140. That database returns LRN information 212-484-9999. As with the call flow of FIG. 3, the called party number parameter is populated with the LRN while the generic address parameter is populated with the dialed number. In this instance however, the query indicator is adjusted to reflect the fact that the number portability database has been queried in this attempt to complete the call. The LRN response information is then used by end office 110 to route the call to the end office to which station B is ported as indicated by the LRN, that is LSP 3 end office 150. That LSP then recognizes its own LRN and obtains the dialed number information from the generic address parameter and completes the call to station B.

In addition to routing the call using the LRN response information from the database, the LRN response information is also provided to the cache 100 in association with the dialed number. This cache entry is designated as a valid entry and is considered as such for some set period of time. For instance, when the results of a query to the number portability database are stored in the local cache, a timer could be set that defines the maximum time interval for which that cached information may be considered as current or valid. At the expiration of this time the entry from the local cache should be flushed. In the event that the cache is full at the time LRN response information is provided for a query and a new entry needs to be stored, the oldest cache entry (that is, the entry whose local cache timer is closest to expiration) must be flushed. It would be beneficial if the timer is refreshed/reset to the maximum timer value every time there is a successful hit in the local cache for this dialed number. This will tend to ensure that the information for the numbers that are dialed frequently will be readily available in the local cache, further greatly reducing the number of queries for such numbers.

Figures 5, 6:
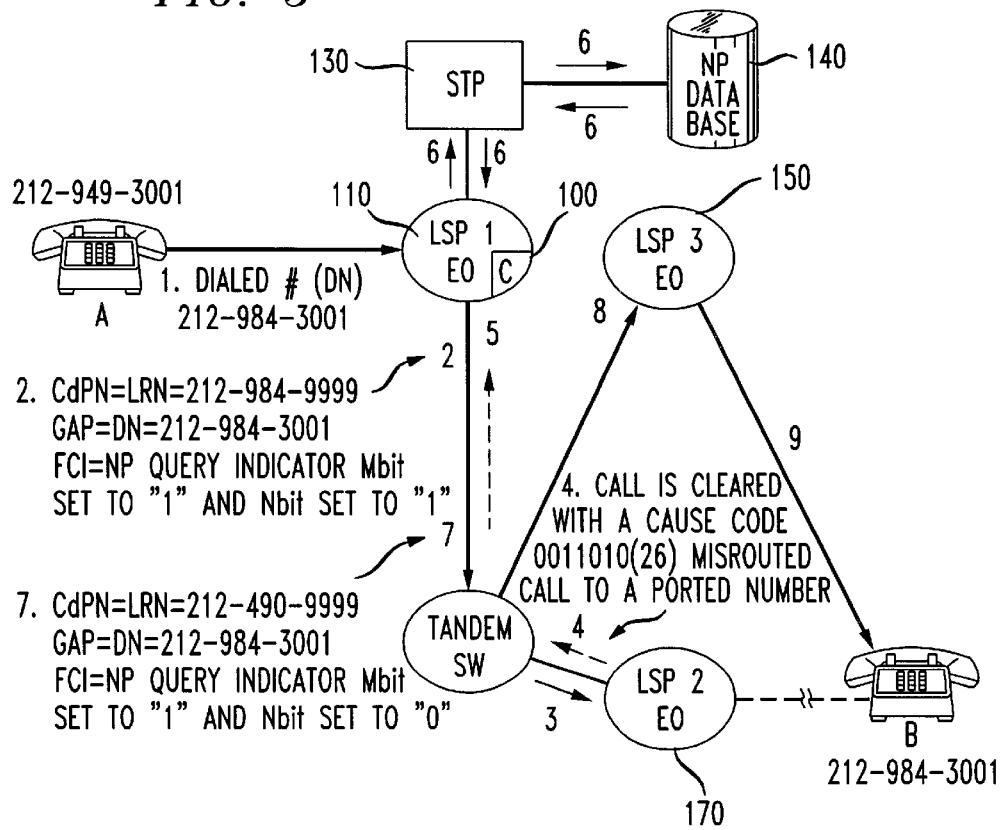
FIG. 6 illustrates the format of parameter information useable in connection with an embodiment of the present invention.

The situation may arise where the LRN information in the cache may be still considered timely within the criteria described above but, in fact, inaccurately reflects the end office which serves the called party B. FIG. 5 of the present application provides a call flow diagram for number portability processing in that instance. In this instance it will be assumed that the cache 100 stores LRN response information indicating that a called party B is ported to LSP 2 of end office 170 and that LRN response information is still considered timely in the cache. Nonetheless, calling party B has been ported to end office 150 for LSP 3. In this circumstance then, the end office 110, upon detecting the NPA-NXX to be portable, and the call to be interswitched, examines the cache and determines that LRN response information is present in the cache. In this instance the LRN response information is the LRN for end office 170, 212-984-9999. This information is placed in the called party number field and the dialed number is placed in the generic address parameter field. The end office 110 then attempts to route the call to the end office corresponding to or identified by the called party number, in this instance end office 170 corresponding to LSP 2. The called party B is no longer served by end office 170. The call to that end office is cleared and a code is sent back to indicate that the end office 170 does not serve the dialed number. Upon receipt of this message because bit N was set in the FCI, end office 110 then knows the cached information was incorrect and generates a query to number portability database 140 via STP 130. The database returns more authoritative LRN response information, in this example 212-490-9999. This LRN response information is now populated in the called party number parameter and the generic address parameter continues to reflect the dialed number, 212-984-3001. In this instance the number portability query indicator is changed to reflect that the number portability database has been queried and that the LRN response information comes from a more authoritative than the local cache.

FIG. 6 illustrates the format of the FCI parameter of the IAM. Of particular significance in this format are bits M and N. Bit M is used by the conventional LRN approach to indicate whether an NP database query has been performed. Of more significance to the current invention is the status of bit N which indicates the relative authority to be ascribed to the CdPN, namely that the information in the IAM has been obtained from the local cache rather than from the number portability database.

Figure 2:
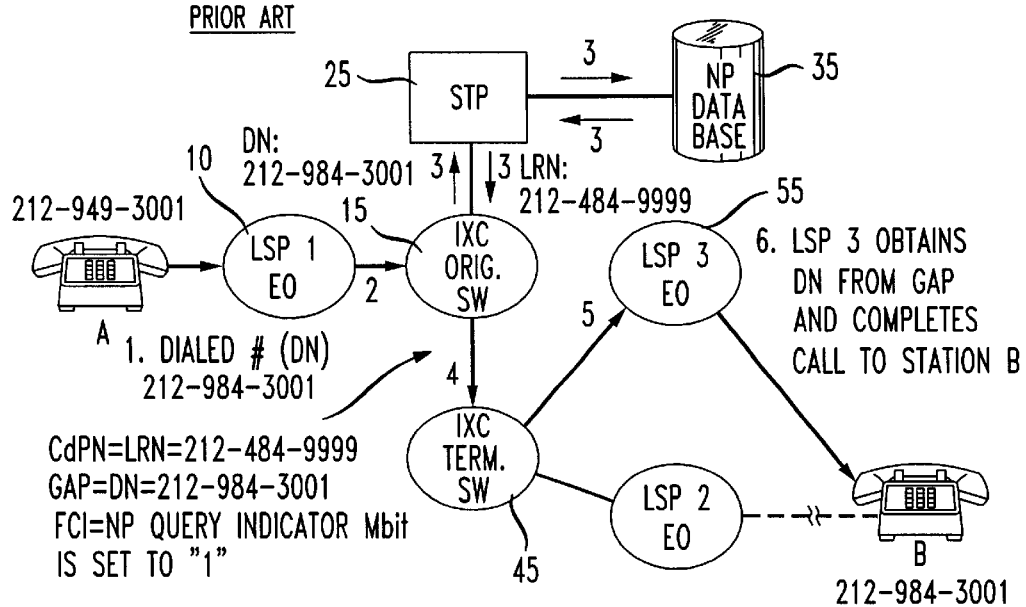

The call flows described in connection with FIGS. 3 to 5 all relate to providing a cache in the end office of the local service provider 1 associated with the calling party A. Thus, there were improvements over the system illustrated in FIG. 1. It is also presumed that one of ordinary skill in the art would be able to recognize employing the cache memory at the switching office of the inter-exchange carrier which is determined to be responsible for call processing as in the example of FIG. 2. Here the cache would then be associated with the IXC originating switch, for example, 15 in FIG. 2. The decision making tree however, would be very similar to the present invention and would provide that the first place one looks for any location routing number response information is the local cache and then if either the cache does not contain LRN response information or in a worst case scenario, if an IAM clearing message indicates that the LRN response information retrieved from the cache is incorrect, the number portability database is accessed to obtain the most authoritative LRN information available at that time.

FIG. 7 illustrates a modification of the present invention illustrated in FIGS. 3 to 5 wherein the calling party is associated with a local service provider 1 which hands off the call to a homogeneous sub-network of LRN capable switches via MF signaling. In that instance, it is the LSP2 end office which would contain the cache. Then after first checking that cache for LRN response information that end office would launch a query to the number portability database if the cache does not contain valid LRN response information. The NP database would in turn provide LRN response information capable of routing the call to LSP 4. Subsequent call processing would be the same as described above.

In all of the above examples the called party B is ported. Where the called party is not ported, then any query to the NP database will operate as in the prior art, namely that the dialed number (DN) will be returned to the switch rather than a LRN.

The present invention can be implemented on switches such as 4ESS and 5ESS switches from Lucent Technologies with modifications to call processing software that reflect the call flows described herein.

The present invention provides a unique call processing scheme which reduces the overall number of queries generated and launched to a number portability database by introducing a local cache at the facility which is responsible for routing the call. Thus, portable numbers, regardless of whether the change in service provider relates to limited geographic portability or simply selecting a different access provider, are processed more quickly with fewer required queries to a number portability database.

What is claimed is:

1. A method for enhancing call processing in a number portability environment, the method comprising the steps of:
   (a) recognizing a portable number;
   (b) checking a cache to determine if a location routing number response information for said portable number has been cached, the location routing number response information including at least a 10 digit local routing number of a local service provider;
   (c) if no valid location routing number response information for the portable number has been found in the step of checking, then querying a database that correlates ported numbers to respective location routing numbers to determine proper routing for said portable number; and
   (d) routing a call to the portable number in accordance with the location routing number response information obtained in either step (b) or step (c).

2. The method of claim 1 further comprising the step of caching the location routing number response information for said portable number obtained upon querying said database.

3. The method of claim 2 further comprising the step of rendering invalid the oldest entry in said cache if said cache is full at the time of performing the step of caching.

4. The method of claim 2 further comprising the steps of:
   starting a timer set to a maximum time interval upon caching the location routing number response information; and
   rendering invalid an entry in the cache if said timer exceeds said maximum time interval.

5. The method of claim 4 further comprising the step of resetting the timer corresponding to said location routing number response information if the location routing number response information is found in the cache in step (b).

6. A method for routing a call directed to a portable number, the method comprising the steps of:
   (a) receiving a dialed number;
   (b) recognizing said dialed number as a portable number;
   (c) checking a cache to determine if location routing number response information for said portable number has been cached, the location routing number response information including at least a 10 digit local routing number of a local service provider;
   (d) attempting to route a call to the portable number in accordance with said location routing number response information obtained from said cache;
   (e) if there is a failure to complete the call after the attempt of step (d), receiving a notification of the failure to complete the call after attempting to route in step (d); and
   (f) upon receiving said notification, querying a database to obtain location routing number response information corresponding to said portable number.

7. The method of claim 6 further comprising the step of caching said location routing number response information obtained in step (f).

8. The method of claim 7 further comprising the step of rendering invalid the oldest entry in said cache if said cache is full at the time of performing the step of caching.

9. The method of claim 7 further comprising the steps of:
starting a timer set to a maximum time interval upon caching said location routing number response information obtained in step f; and
rendering invalid the entry in the cache if the timer exceeds said maximum time interval.

10. The method of claim 9 further comprising the step of resetting the timer corresponding to said location routing number if the location routing number is found in the cache in step (b).

11. In a communication system in which a telephone number is portable between at least two service providers, a method for connecting a call from an originating party to the portable number, the method comprising the steps of:
receiving a dialed number at a local office associated with the originating party;
checking a cache associated with said local office for location routing number response information associated with said dialed number, the location routing number response information including at least a 10 digit local routing number of a local service provider; and
if location routing number response information is associated with said dialed number in said cache, attempting to route the call to said dialed number using said location routing number response information.

12. The method of claim 11 further comprising the steps of:
if no valid location routing number response information is associated with the dialed number in said cache, then querying a database for a location routing number response information associated with said dialed number;
receiving a location routing number response information in response to said step of querying; and
attempting to route the call using the location routing number response information received from the database.

13. The method of claim 12 further comprising the step of caching said location routing number response information received from the database.

14. The method of claim 13 further comprising the step of rendering invalid the oldest entry in said cache if said cache is full at the time of performing the step of caching.

15. The method of claim 13 further comprising the steps of:
upon caching the location routing number response information starting a timer set to a maximum time interval; and
if the timer exceeds said maximum time interval rendering invalid the entry in the cache.

16. The method of claim 15 further comprising the step of resetting the timer corresponding to said location routing number response information if it is found in the cache in step (b).

17. The method of claim 12 wherein said database services a plurality of local offices.

18. The method of claim 11 wherein a location routing number response information retrieved from the cache corresponds to a first service provider and at the time of attempting to route the call the dialed number is served by a second service provider, then receiving a notification of failure to complete the call.

19. The method of claim 18 comprising the further steps of:
upon receiving said notification,
querying a database for a location routing number response information associated with said dialed number; and
attempting to route the call using the location routing number received from the database.

20. The method of claim 19 wherein said location routing number response information received from the databases identifies said second service provider.

21. The method of claim 20 wherein the first and second service providers correspond to first and second local switching offices respectively.

22. The method of claim 20 wherein the first and second service providers correspond to first and second carriers respectively.

* * * * *